United States Patent Office 3,344,330
Patented Sept. 26, 1967

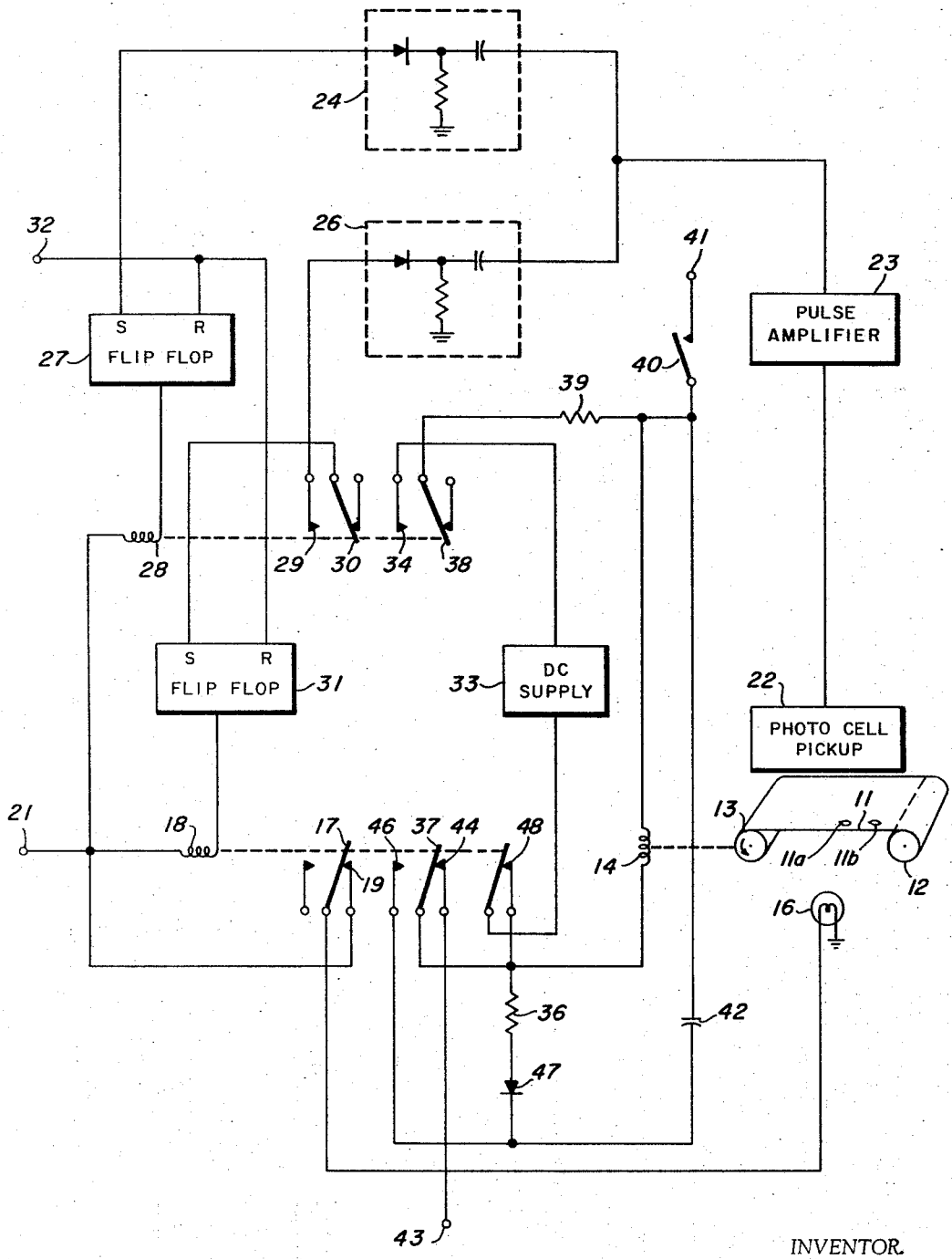

3,344,330
CHART INDEXING SYSTEM HAVING
DECELERATION AND BRAKING
John A. Belanich and Thomas R. Bignell, San Diego,
Calif., assignors, by mesne assignments, to Honeywell
Inc., Minneapolis, Minn., a corporation of Delaware
Filed Aug. 10, 1964, Ser. No. 388,590
4 Claims. (Cl. 318—275)

ABSTRACT OF THE DISCLOSURE

A chart advance indexing system including an A.C. motor for driving a chart and a photocell and amplifier for sensing apertures within the chart. A first switch applies D.C. to the motor for slowing the motor when a first aperture is sensed by the photocell. A second switch removes the A.C. and D.C. from the motor and discharge a capacitor therethrough for stopping the motor when a second aperture is sensed by the photocell.

The present invention relates to a chart advance indexing system and more particularly to a chart advance indexing system in which a chart advance motor is stopped electronically in two stages.

Indexing in prior chart advance mechanisms is generally accomplished by counting revolutions of a sprocket or gear assembly, or similar means of mechanical counting. These systems have the obvious disadvantages attendant to mechanical braking in general i.e. expense, maintenance, repair, etc., and it has been found that they are not capable of exact or precise indexing.

According to the invention, a chart advance motor is energized, pulling a chart across an exposed writing surface. An index hole, accurately positioned on the chart, modulates a light beam which is impinging upon a photocell on an opposite side of the chart from the light source. A resultant voltage pulse from the photocell actuates an electrical control circuit which provides a slowing current to the motor to reduce the effect of inertia. A second index hole in the chart serves to supply a braking current to the motor via suitable electrical control circuits. The over-all result is to automatically position the chart accurately and reliably with completely flexible indexing, obviating the necessity of counting gears, sprockets, cams and associated switches.

An object of the present invention is the provision of a chart indexing system which utilizes a two-stage electronic braking.

Another object is to provide a chart advance indexing system which is extremely flexible in chart positioning.

A further object of the invention is the provision of a chart advance indexing system with a minimum of moving parts.

Yet another object is to provide a chart advance indexing system which is simple, relatively inexpensive and requires a minimum of maintenance and adjustments.

Other objects and many of the attendant advantages of this invention will be readily appreciated as the same becomes better understood by reference to the following detailed description when considered in connection with the accompanying drawing in which the sole figure is a functional block diagram of the preferred embodiment of the present invention.

Referring to the drawing, chart 11 is stretched between supply roll 12 and take up roll 13. Take up roll 13 is mechanically coupled to a chart advance A.C. motor (not shown) having a field winding 14. The A.C. motor may be one of several configurations known in the art, as for example an A.C. motor having a squirrel cage rotor winding. Incandescent lamp 16 is connected on one end to ground and on the other end to contact 17 of relay solenoid 18. Contact 17 in its inactuated position makes electrical contact with contact 19 of solenoid 18 which is connected to a D.C. supply voltage at terminal 21. Photocell 22 opposite chart 11 and lamp 16 is connected to amplifier 23, the output of which is connected to the input of two differentiator-clampers 24 and 26.

The output of differentiator-clamper 24 is connected as a set input to flip-flop 27, and the output of differentiator-clamper 26 is connected to forward contact 29 of relay solenoid 28. Movable contact 30 of relay solenoid 28 is connected as a set input to flip-flop 31. The output of flip-flop 27 is connected through relay solenoid 28 to D.C. supply terminal 21, and the output of flip-flop 31 is connected through relay solenoid 18 to supply terminal 21. Reset terminal 32 is connected to reset inputs of flip-flop 27 and flip-flop 31.

D.C. supply 33 has one side connected to forward contact 34 of relay solenoid 28 and the other side connected through back contact 48 of relay solenoid 18 to a junction of the A.C. motor winding 14, resistance 36, and movable contact 37 of relay solenoid 18. Movable contact 38 of relay solenoid 28 is connected through current limiting resistor 39 to A.C. line terminal 41, through a manual control switch 40. Terminal 41 is also connected to one side of the A.C. motor winding 14 and capacitor 42 through switch 40. The second A.C. line terminal 43 is connected to forward contact 44 of relay solenoid 18. Back contact 46 of relay solenoid 18 is connected to a junction between diode 47 and capacitor 42. The other side of diode 47 is connected to resistance 36.

Operation

Quiescently, at the time it is desired to advance chart 11 one frame, flip-flops 27 and 31 are in their set condition and relay solenoids 18 and 28 are energized. (They are shown in their de-energized position.) At this time the A.C. motor winding 14 is across capacitor 42, which is fully discharged. The motor driving take up roll 13 is therefore motionless. Likewise, relay contact 48 is open allowing no D.C. from D.C. supply 33 to flow through the A.C. motor winding 14.

A D.C. pulse is suplied to reset terminal 32 when an advance button (not shown) is depressed which resets flip-flops 27 and 31 de-energizing relay solenoids 18 and 28 (to the position shown). At this time, lamp 16 is lit through forward contact 19 of relay solenoid 18. At the same time the advance button is depressed, the A.C. motor winding 14 is energized through forward contact 44 of relay solenoid 18 by placing the winding between A.C. terminals 41 and 43. Manual control switch 40 is provided to override the chart advance indexing system and provide a means for manually stopping the chart 11 when it is opened. This switch, shown in an open position, is closed under normal operating conditions.

As chart 11 advances, a steady light from lamp 16 impinges upon photocell 22, which does not yield a pulse output to pulse amplifier 23. When one index marker 11a on chart 11 passes between lamp 16 and photocell 22 the light from lamp 16 is modulated, and a pulse from photocell 22 is presented to pulse amplifier 23. This pulse is amplified and passed through differentiator-clamper 24 which differentiates the pulse, clamps the leading edge and uses the trailing edge to set flip-flop 27. At this time relay solenoid 28 is energized, pulling movable contact 38 into contact with contact 34 supplying a D.C. current from D.C. supply 33 through current limiting resistor 39 and back contact 48 of relay solenoid 18 to the A.C. motor winding 14. This D.C. serves to superimpose itself upon the A.C. within the field winding 14 and tends to saturate the core thereof which is energizing the A.C. motor and hence slow the motor. This first pulse cannot set flip-flop 31 because relay contacts 29 and 30 of relay solenoid 28 are in the open position shown at the time the pulse is presented.

When a second indexing marker 11b passes between lamp 16 and photocell 22 another pulse is presented to pulse amplifier 23, differentiated and clamped in differentiator-clamper 26 and applied through relay contacts 29 and 30 (which are now closed due to the energization of relay solenoid 28) to set flip-flop 31. Flip-flop 31 then supplies energizing current to relay solenoid 18, which extinguishes light 16, and applies charged capacitance 42 across the A.C. motor winding 14 via closed contacts 37 and 46 of relay solenoid 18. At the same time, contacts 37 and 44 remove A.C. from the A.C. motor winding and contact 48 opens to remove the D.C. supplied by D.C. supply 33 therefrom. Capacitor 42 has previously charged through resistance 36 and diode 47. The surge of D.C. from charged capacitor 42 through the A.C. motor winding 14 will stop the slowed A.C. motor instantaneously, providing an extremely accurate chart indexing system, and the system is ready for the next advance signal at reset terminal 32.

It can be seen that the foregoing method of indexing is extremely simple, accurate and versatile since it is accomplished by the placement of indexing markers or apertures on chart 11.

It should be understood of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

We claim:
1. A chart advance indexing system comprising:
 (a) a chart roll having at least one pair of first and second indexing means for indexing at least one predetermined position;
 (b) an electric motor mechanically coupled to said chart roll for advancing said chart roll;
 (c) light sensitive means in proximity to said chart roll and adjacent to a first side thereof;
 (d) illuminating means in proximity to said chart adjacent to a second side thereof and positioned opposite said light sensitive means for passing a predetermined intensity of light through said chart roll onto said light sensitive means;
 (e) said at least one pair of first and second indexing means positioned on said chart roll for passing between said illuminating means and said light sensitive means at predetermined intervals when said motor is advancing said chart roll;
 (f) first switching means coupled to said light sensitive means, said first switching means being actuated by said light sensitive means and said illuminating means when said first indexing means passes between said light sensitive means and said illuminating means;
 (g) a second switching means coupled to said light sensitive means;
 (h) holdoff means coupled to said second switching means for preventing said second switching means from being actuated until said first switching means is actuated, said second switching means being actuated by said light sensitive means when said second indexing means passes between said light sensitive means and said illuminating means;
 (i) means for applying electrical driving current to said motor;
 (j) means connected to said first switching means for applying electrical slowing current to said motor; and
 (k) means connected to said second switching means for disconnecting said driving current and said slow current from said motor and connecting a stopping current to said motor.

2. The chart advance indexing system of claim 1 wherein said slowing current comprises a saturating direct current.

3. The chart advance indexing system of claim 1 wherein said stopping current comprises a direct current supplied by a charged capacitor.

4. A chart advance indexing system comprising:
 (a) a chart roll having at least one pair of first and second indexing means for indexing at least one predetermined position;
 (b) an A.C. source;
 (c) an A.C. motor connected to said A.C. source and mechanically coupled to said chart roll for advancing said chart roll;
 (d) light sensitive means in proximity to said chart roll and adjacent to a first side thereof;
 (e) illuminating means in proximity to said chart adjacent to a second side thereof and positioned opposite said light to a second side thereof and positioned opposite said light sensitive means for passing a predetermined intensity of light through said chart roll onto said light sensitive means;
 (f) said at least one pair of first and second indexing means positioned on said chart roll for passing between said illuminating means and said light sensitive means at predetermined intervals when said motor is advancing said chart roll;
 (g) first switching means coupled to said light sensitive means arranged to be actuated by a pulse formed when said first indexing means passes between said illuminating means and said light sensitive means;
 (h) second switching means;
 (i) a D.C. source;
 (j) means associated with said first switching means for connecting said second switching means to said light sensitive means and connecting said D.C. source to said motor when said first switching means is actuated for slowing said motor;
 (k) capacitance means associated with said motor and charged by said D.C. source when said source is connected to said motor;
 (l) means associated with said second switching means for disconnecting said D.C. source and said A.C. source from said motor when said second switching means is actuated by a second pulse from said second indexing means for slowing said motor; and
 (m) further means associated with said second switching means for discharging said capacitance means through said motor as said D.C. and A.C. sources are disconnected therefrom for stopping said motor.

References Cited

UNITED STATES PATENTS

| | | | |
|---|---|---|---|
| 2,445,806 | 7/1948 | Snyder | 318—212 |
| 2,677,087 | 4/1954 | Willmott | 318—212 |
| 3,244,955 | 4/1966 | Turner et al. | 318—162 X |

ORIS L. RADER, *Primary Examiner.*

B. A. COOPER, *Assistant Examiner.*